United States Patent [19]

Hill

[11] Patent Number: 4,601,624

[45] Date of Patent: Jul. 22, 1986

[54] FASTENER HEAD COVER ASSEMBLY

[75] Inventor: Royce W. Hill, Flippin, Ark.

[73] Assignee: Ark-Plas Products Inc., Flippin, Ark.

[21] Appl. No.: 797,485

[22] Filed: Nov. 13, 1985

Related U.S. Application Data

[63] Continuation of Ser. No. 604,538, Apr. 27, 1984, abandoned.

[51] Int. Cl.$^4$ ............................................. F16B 37/14
[52] U.S. Cl. ..................... 411/373; 411/396; 411/431
[58] Field of Search ............... 411/373, 371, 372, 377, 411/396, 431, 429; 24/90 TA, 90 A, 113 MP

[56] References Cited

U.S. PATENT DOCUMENTS

| | | | |
|---|---|---|---|
| 1,805,937 | 5/1931 | Berge | 411/372 |
| 1,936,624 | 11/1933 | Gelpcke | 411/372 |
| 3,881,391 | 5/1975 | Dereszynski | 411/373 X |
| 3,930,432 | 1/1976 | Puchy | 411/376 |
| 4,129,060 | 12/1978 | Gould | 411/371 |
| 4,136,598 | 1/1979 | Hughes | 411/372 |

FOREIGN PATENT DOCUMENTS

| | | | |
|---|---|---|---|
| 2242870 | 3/1974 | Fed. Rep. of Germany | 411/373 |
| 1211068 | 10/1959 | France | 411/373 |
| 1281713 | 12/1961 | France | 411/373 |
| 1296753 | 5/1962 | France | 411/373 |
| 608864 | 9/1960 | Italy | 411/373 |
| 374858 | 3/1964 | Switzerland | 411/373 |
| 890049 | 2/1962 | United Kingdom | 411/373 |
| 916941 | 1/1963 | United Kingdom | 411/373 |
| 1116444 | 6/1968 | United Kingdom | 411/373 |

Primary Examiner—Gary L. Smith
Assistant Examiner—Adrian H. Whitcomb, Jr.
Attorney, Agent, or Firm—Stephen D. Carver

[57] ABSTRACT

A two piece, resilient plastic assembly for decoratively covering the head of an installed fastener such as a screw or the like. The assembly comprises a resilient base member adapted to be held by the fastener or screw upon a planar portion of a workpiece. A resilient anchor member includes a planar, flange like base of generally circular cross section having a central orifice defined therein through which a screw or fastener passes, and an integral peripheral rim having an external surface upon which a plurality of radially spaced apart petals are integrally formed. A cup-like, resilient plastic cover plate adapted to be snap-fitted upon the anchor includes a generally convex top portion and a peripheral downwardly projecting rim. The cover plate rim includes a snap fit groove into which the anchor petals are received. This snap fit groove is separated from a lower expansion groove by an apex, and when the cover plate is pushed upon the anchor, the cap rim is expanded and the petals are slightly compressed by the compression groove. The anchor semipermanently secures the cover plate when the petals subsequently occupy the the snap fit groove, the geometry of which conforms generally to the profile of the petals.

5 Claims, 8 Drawing Figures

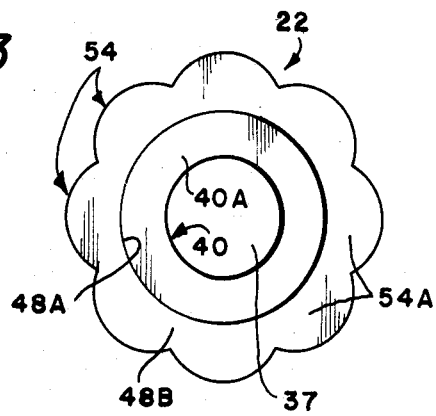
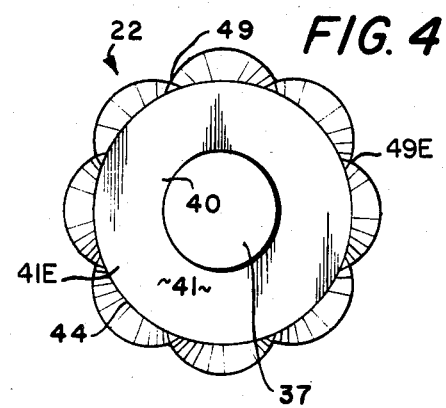
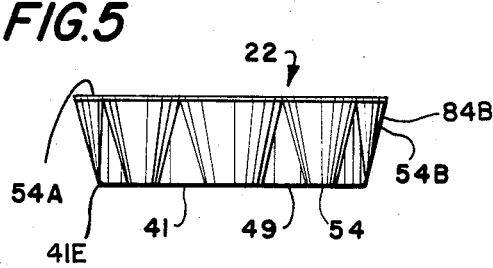
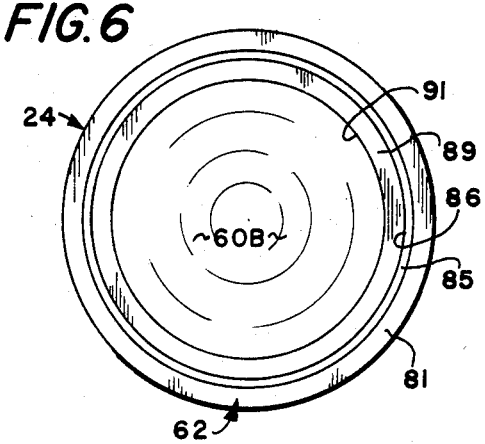
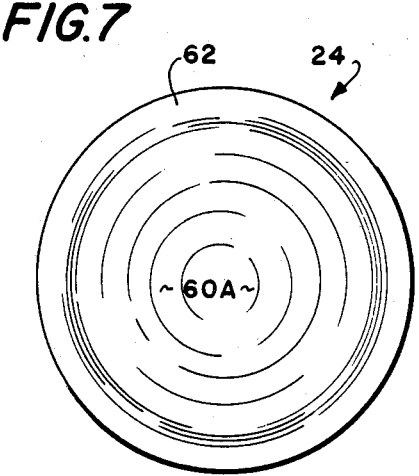
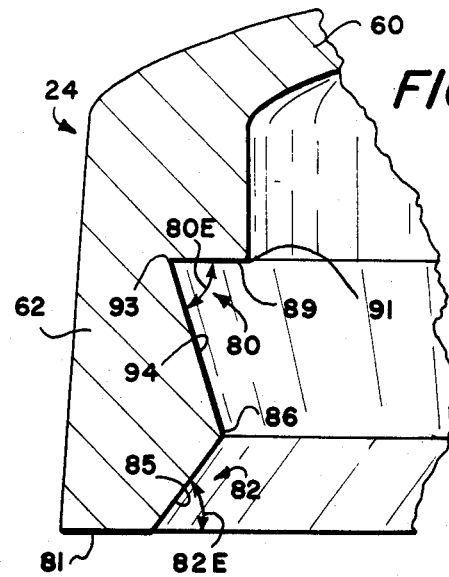

FASTENER HEAD COVER ASSEMBLY

This is a continuation of application Ser. No. 604,538, filed 04/27/84 now abandoned.

BACKGROUND OF THE INVENTION

The present invention relates generally to multiple piece fastener head cover assemblies. More particularly, the present invention relates to a two-piece decorative assembly having an anchor base member adapted to be secured by a fastener such as a screw or the like, and a cooperating upper cap which snap-fits to the anchor and is releasably, semi-permanently secured thereto.

In the prior art a variety of both plastic and metallic devices are known. In most applications where a fastener such as a screw, bolt or the like is inserted upon a workpiece, the external head of the fastener or screw is left visually apparent to the consumer of the workpiece. Obviously this may present deleterious aesthetic objections. Accordingly, a number of prior art inventions have been proposed wherein multiple piece items are employed in conjunction with the fastener to cover the head thereof once the apparatus is installed.

U.S. Pat. No. 4,129,060 discloses a self closing cover which "shuts" when the fastener is installed. Related art is also seen in U.S. Pats. Nos. 2,548,004; 1,936,624; 3,979,803; 1,805,937; 4,136,598; 4,316,690; 2,513,182; 2,931,005; 465,289; 1,644,475; 2,654,927; 3,979,802 and 3,881,391. A related two piece assembly of extremely complex and limited geometry is shown in U.S. Pat. No. 3,930,432. It is believed that the latter reference is the most relevant American patent known to me. The fastener device of U.S. Pat. No. 3,618,444 covers the head of the fastener, while also sealing the surface of the member into which the fastener is installed. U.S. Pat. No. 4,154,138 discloses a complex screw assembly equipped with a plastic head covering.

A variety of foreign patents are known which relate to the present concept. United Kingdom patent No. 345,745 is believed to be the most relevant of the foreign patents known to me. Other relevant U.K. patents include numbers 870,160; 916,161; 916,162; and, 890,049. Other relevant foreign prior art patents include French patents Nos. 1,175,054 and 1,397,500; Canadian patent no. 784,462, and Russian patent No. 483,543.

However, to be reasonably practical, the fastener covering assembly must install quickly and easily upon a workpiece without breaking. Similarly, the fastener must be capable of being removed where necessary to permit subsequent maintenance upon the object or workpiece to which the covered fastener is assembled. Accordingly the cover assembly must be capable of rapid manual assembly, but the "snap-fit" structure must not crack in response to pressure or unnecessarily deform in response to time. It is also advantageous to provide such a structure with inherent mechanical resistance to temperature variations.

SUMMARY OF THE INVENTION

The present invention comprises a two-piece, resilient plastic assembly for decoratively covering the head of a conventional fastener such as a screw, bolt or the like. The assembly includes a resilient, generally circular anchor member adapted to be secured against a workpiece by the fastener being covered, and a cooperating, separate cap member which snap-fits to the anchor.

The anchor preferably includes a generally circular base member having a central, inner orifice through which the fastener passes. This flange-like base member is secured against a planar portion of the workpiece by the head of the fastener being covered. A surrounding, upwardly projecting, integral rim projects outwardly from the base member, and includes a plurality of externally formed, integral petal-like snapping members defined thereon. Each of the petals are shaped generally in the form of a conic section. The larger diameter portions of these petals is oriented at the top of the anchor member, and the dimensions of the petals decrease toward the base of the anchor member.

The cap includes a generally convex top portion which is integral with a downwardly projecting peripheral rim. The rim includes an inner snap-fit groove conformed generally to the shape of the aforementioned petals, which is separated from a lower, cooperating expansion groove by an inwardly projecting apex. The lower expansion groove initially contacts the petals and compresses the top's rim and, enabling the petals to "clear" the apex. Subsequent relative displacement of the petals with respect to the apex facilitates a snap-fit within the snap-fit groove. Hence the cap is resiliently and releasably coupled to the anchor member with the head of the covered fastener captured within the assembly.

In a preferred mode of the present invention the outermost edge of the petals forms an angle of approximately 75 degrees with the anchor member top, and the snap-fit groove within the cover plate rim is similarly configured. In the preferred form of the invention the petals associated with the anchor member are integral therewith and are radially spaced apart about the external periphery thereof. The top of each petal is substantially horizontal, and is coplanar with the top of the anchor rim. Preferably the outermost edge of each petal forms an angle of approximately 75 degrees with the petal top. The snap fit groove defined within the cover plate rim is similarly configured. The expansion groove in the rim of the snap-fit cover includes a side wall forming an angle of approximately 60 degrees with the bottom of the cover rim.

Thus a broad object of the present invention is to provide a resilient plastic assembly for covering the heads of fasteners such as screws, bolts or the like.

A similar object of the present invention is to provide a two piece, resilient snap-fitting cover assembly which may be quickly assembled manually, and which may be similarly quickly disassembled with the use of a simple tool such as a screw driver or the like.

Yet another object of the present invention is to provide an unbreakable two piece plastic cover assembly of the character described.

A still further object of the present invention is to provide a cover plate for the assembly of the character described which will gently expand on contact of the anchor plate. It is a feature of the present invention that the petal structure formed on the sides of the anchor rim tend to gently expand the rim of the cooperating cap when riding within the expansion groove defined in the cap rim.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is an enlarged top plan view of the anchor member;

FIG. 4 is an enlarged bottom plan view of the anchor member;

FIG. 5 is a side view of the anchor member;

FIG. 6 is an enlarged bottom plan view of the cap member;

FIG. 7 is an enlarged top plan view of the cap member; and,

FIG. 8 is an enlarged, fragmentary sectional view of a portion of the cap rim illustrating the snap fit and expansion groove geometry in detail;

DETAILED DESCRIPTION OF THE DRAWINGS

Figure 1:
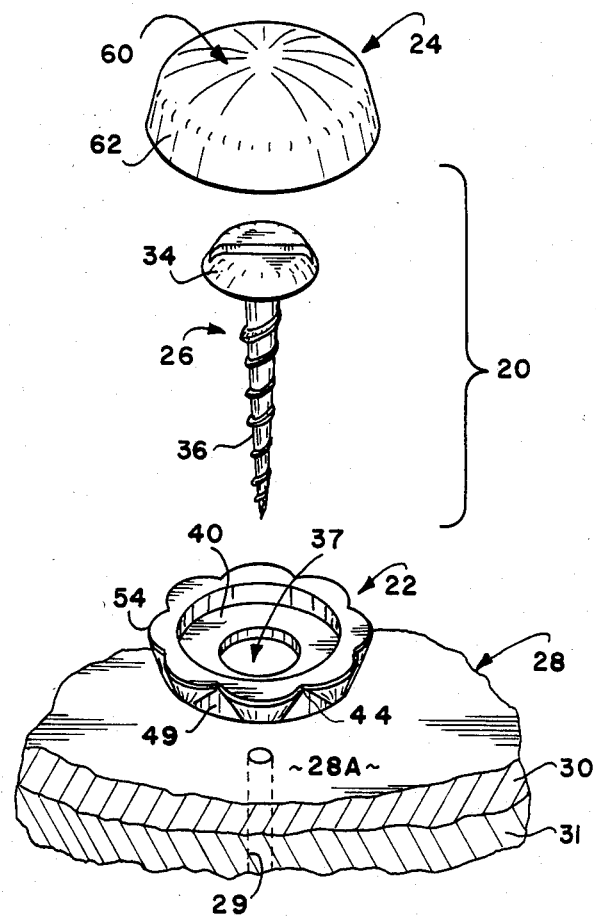
FIG. 1 is an exploded isometric assembly view illustrating the operative position of the major parts of the invention, including the fastener captured thereby.
Figure 2:
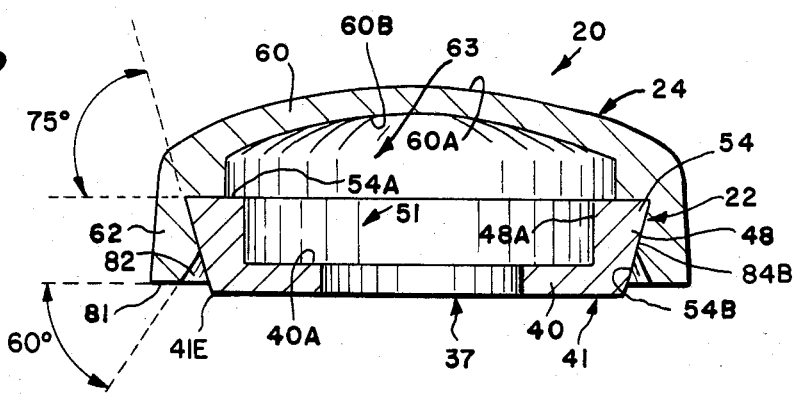
FIG. 2 is an enlarged sectional view of the assembly with the cap portion snap fitted upon the anchor member, with the captured fastener omitted for clarity.

With initial reference to FIGS. 1 and 2 of the drawings, a two piece, resilient plastic head cover assembly has been generally designated by the reference numeral 20. Assembly 20 is adapted to be restrained by a conventional fastener such as screw 26 which, as will be appreciated by those skilled in the art, is secured within an appropriate orifice 29 defined within a work piece 28. While a self tapping screw 26 is illustrated, it must be appreciated that a wide variety of other fasteners including bolts, machine screws, lag bolts, and the like may be employed in conjunction with the present invention.

FIG. 1 illustrates a portion of a workpiece 28 having a generally planar surface area 28A. As illustrated, workpiece 28 may include a pair of aligned planar members 30 and 31 which are to be secured together by the fastener screw 26. In other words, planar members 30, 31 will be secured together when head 34 of screw 26 is appropriately twisted to drive shank 36 securely within orifice 29. (Of course the orifice 29 may be created by the self tapping screw illustrated by way of example.) The assembly 20 is secured against the generally planar surface area 28A of workpiece 28 by screw 36, the head portion 34 of which secures anchor 22 against surface 28A. Of course shank 36 will penetrate orifice 37 when the anchor member 22 is secured against workpiece 28 by head 34. Thereafter cap 24 may be snap fitted to the anchor member 22 to cover screw head 34 as will hereinafter be described.

With additional reference now directed to FIGS. 2–5, anchor member 22 includes a generally planar, flange-like base 40 in the shape of a ring which concentrically surrounds orifice 37. The flat round bottom 41 of the flange-like base 40 corresponds to the bottom of the anchor 22. It will be appreciated that surface 41 smoothly abuts workpiece surface 28A when assembly 20 is installed. The outermost edge 44 of the base 40 marks the edge of an upwardly projecting, integral peripheral rim 48 which coaxially surrounds both orifice 37 and base 40. In the best mode rim 48 is actually in the form of an inverted frustum of a cone. With reference to FIGS. 4 and 5, it is seen that the diameter of the bottom outer edge 41E of bottom surface portion 41 (which will operationally contact the surface 28A of FIG. 1) is smaller than the diameter of upper, circular rim edge portion 44. A generally cylindrical void, designated by the reference numeral 51, is formed between the innermost edges 48A of rim 48 and the top interior surface 40A of flange base 40. It will be appreciated that once apparatus 20 is properly installed, at least a substantial volume of screw or fastener head 34 will be disposed within region 51.

As best viewed in FIGS. 1 and 3–5, the anchor member 22 includes a plurality of radially spaced-apart, integral petals 54 formed upon the external surface 49 of the anchor rim 48. As best viewed in FIGS. 1, 4 and 5, each of the petals 54 are generally in the shape of a section of an inverted cone. The resultant petal shape may be generally geometrically expressed as a portion of an inverted frustum of a cone bisected from the main body of the cone by intersection with the outer surface of a much larger cones' inverted frustum. Each of the petals includes a generally horizontal top portion 54A which is coplanar with the contiguous top portion 48B of the rim. In other words, surface portions 48B, 54A (FIG. 3) form a continuous, substantially regular planar surface which is oriented substantially parallel with the planar surface 28A of the workpiece 28 when assembly 20 is installed. As best viewed in FIG. 3, a vertical sectional view taken through a portion of a petal will generally present a substantially semi-circular profile. Moreover, the outermost edge portion of each petal has been designated by the reference numeral 54B as appreciated from FIG. 2. As will hereinafter be explained in detail this outermost edge portion 54B of the petal is preferably configured in this specific fashion for proper interfitting with the cooperating cap 24.

With reference now to FIGS. 1, 2 and 6–8, the resilient cover plate 24 is adapted to yieldably, snap-fit to the anchor member 22. The cover plate 24 includes a generally convex cap portion 60 having a top surface 60A and an interior or bottom surface 60B, which is integral with a peripheral, downwardly projecting rim generally designated by the reference numeral 62. The interior region 63 of the cap is thus defined between rim 62 and convex top 60, and when assembly 20 is assembled region 63 will be generally contiguous with previously described region 51, permitting the covering of relatively large screw heads.

As best viewed in FIGS. 2 and 8, rim 62 of cover plate 24 includes an internal snap-fit groove generally designated by the reference numeral 80 (FIG. 8) into which the petals 54 of the anchor member 22 are disposed in the assembled condition. This groove 80 is of a generally notch shaped configuration, and its shape is substantially similar to the side profile of the petals 54 as illustrated FIG. 2. A cooperating expansion groove, generally designated by the reference numeral 82, is separated from the snap fit groove 80 by an integral, inwardly projecting apex 86. When the cap 24 is initially placed upon and forced against anchor member 22, the rim portion 62 of the cap will expand in response to gradual force distributed to the rim by frictional engagement of the petals 54 against the sidewall 85 of the expansion groove 82. Once relative displacement of the cap 24 relative to the anchor 22 moves petals 54 "over" apex 86, the rim of the cap will be free to contract to its former dimensions, with the petals 54 firmly engaged within the groove 80. The petals and the base rim portion will first be compressed slightly and then will expand once seated within the snap fit groove after installation of the cap. The outermost edges 84B of all of the petals concurrently abut the similarly-profiled internal surface 94 (FIG. 8) of the cap 24.

The snap fit groove 80 includes a top portion 89 which is oriented substantially horizontally. Portion 89 (FIG. 8) extends from the innermost corner 93 of groove 80 terminating at an edge 91 marking the boundary between the groove structure and the internal volume 63 (FIG. 2) previously discussed. Sidewall 94 of groove 80 forms an angle of approximately 75 degrees with respect to groove top 89, as illustrated in dashed lines in FIG. 2. Also, it is preferable that the expansion groove sidewall 85 be angled at approximately 60 degrees with respect to the horizontal as indicated generally in dashed lines in FIG. 2. With reference to FIG. 8, the side wall 85 of the expansion groove 82 forms an angle 82E of approximately 60 degrees with respect to horizontal bottom 81 of the cap rim 62. Similarly, an angle 80E of approximately 75 degrees is preferably formed between snap groove wall 94 and the horizontal. As will also be appreciated in FIG. 8, the apex 86 separating grooves 80, 82 projects inwardly towards orifice 37, but is located radially further from the center of the assembly than is the corner 91 dividing groove top 89 from the internal volume 63 previously discussed.

As best viewed in FIG. 2, the bottom 81 of the cap rim terminates short of the horizontal surface upon which the apparatus 20 is installed. In other words, it will be apparent that bottom 81 is offset from the anchor member bottom 41. Bottom 41 directly contacts the surface 28A upon which apparatus 20 is installed, but the offset cap bottom 81 preferably does not. This facilitates the subsequent removal of the cap 24 where necessary to expose captured fastener 34 for subsequent removal, maintenance or the like.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A two piece, resilient plastic head cover assembly for decoratively covering the head of a conventional screw, bolt, or the like installed in or through a workpiece, at least a portion of said workpiece being substantially planar, said assembly comprising:
    an anchor member adapted to be secured in operative position by said screw, bolt or the like upon said planar portion of said workpiece, said anchor member comprising:
        a planar flange-like base of generally circular cross section having a central orifice defined therein for admitting said screw or the like therethrough, said base having an outer peripheral edge;
        a bottom comprising a flat underside of said base;
        an integral peripheral rim rising upwardly from the outer peripheral edge of said base, said rim coaxially surrounding said central orifice, said rim having a top and an external circumferential periphery;
        a plurality of radially spaced apart petals integrally formed upon said rim, said petals being generally in the form of an inverted conic section intersecting the periphery of said rim, and each of said petals having an outermost inclined edge; and,
        each of said petals comprising a horizontal top coplanar and contiguous with the top portion of said anchor member base rim and oriented substantially parallel with the planar surface of said workpiece when said assembly is installed upon said workpiece; and,
    a cup-like, resilient plastic cover plate adapted to be yieldably snap fitted to said anchor member to decoratively cover a head of said screw, fastener or the like, said cover plate comprising:
        a generally convex top portion;
        a peripheral downwardly projecting rim integral with said top portion, the last mentioned rim having an internal snap-fit groove defined therewithin for receiving said petals, said snap fit groove having a notch-like cross section conformed generally to frictionally contact the outermost inclined edges of each of said petals whereby to secure said cover plate to said base; and,
        an expansion groove defined interiorly of said cover plate rim in spaced-apart, generally parallel relation with respect to said snap fit groove and separated therefrom by an apex, said expansion groove adapted to expand said cover plate rim and initially slightly compress said petals when said cover plate is forcibly fitted to said anchor member.

2. The assembly as defined in claim 1 wherein said anchor member rim periphery is in the form of the external surface of an inverted frustum of a cone.

3. The assembly as defined in claim 1 wherein:
    said snap-fit groove includes an inner top, a side wall intersecting said inner top and extending between said top and said apex and forming an angle of approximately 75 degrees between it and said last mentioned top; and,
    the outermost edge of each of said petals intersects said horizontal petal top forming an angle of approximately 75 degrees between itself and said last mentioned top.

4. The assembly as defined in claim 3 wherein said expansion groove includes a side wall extending from a bottom of said cover plate rim to and intersecting said apex, said last mentioned side wall forming an angle of approximately 60 degrees between it and said last mentioned bottom.

5. The assembly as defined in claim 4 wherein said anchor member rim periphery is in the form of the external surface of an inverted frustum of a cone.

* * * * *